March 16, 1943.     F. D. JOHNSON     2,313,942
RELAY SYSTEM
Filed April 11, 1941     3 Sheets-Sheet 1

WITNESSES:
E. A. McCloskey
C. L. Freedman

INVENTOR
Floyd D. Johnson
BY
ATTORNEY

March 16, 1943. F. D. JOHNSON 2,313,942
RELAY SYSTEM
Filed April 11, 1941 3 Sheets-Sheet 3

WITNESSES:
E. A. McCloskey
C. L. Freedman

INVENTOR
Floyd D. Johnson.
BY
ATTORNEY

Patented Mar. 16, 1943

2,313,942

UNITED STATES PATENT OFFICE 2,313,942

RELAY SYSTEM

Floyd D. Johnson, Pittsburgh, Pa., assignor to Westinghouse Electric & Manufacturing Company, East Pittsburgh, Pa., a corporation of Pennsylvania Application April 11, 1941, Serial No. 388,079

21 Claims. (Cl. 175—294)

This invention relates to electrical distribution systems, and it has particular relation to network protectors for secondary network distribution systems.

For supplying electrical energy to urban areas representing a substantial density in electrical energy consumption and for medium density areas, the secondary network distribution system has proven to be extremely satisfactory. In this system a plurality of feeder circuits are provided for supplying electrical energy to a common secondary network or grid circuit. Each of the feeder circuits is coupled to the secondary network circuit or grid through a plurality of coupling devices which may include a network transformer and a network protector for controlling the connection and disconnection of the network transformer relative to the secondary network circuit.

The network protector has a number of distinct functions to perform. Under normal operating conditions if a fault occurs on the secondary network circuit all network protectors remain closed and the fault is burned clear by the substantial current available from all feeder circuits.

However, if a fault occurs on one of the feeder circuits, the network protectors associated with the faulty feeder circuit trip in order to remove the feeder circuit from service. Under these circumstances, the secondary network circuit continues to receive energy from the remaining sound feeder circuit or circuits. Generally, the selective tripping of a network protector is provided by a device or relay having a directional tripping characteristic.

Assuming that a faulty feeder circuit has been repaired or otherwise restored to sound condition, it is desirable that the network protectors close to reconnect the feeder circuit to the secondary network circuit. To this end each network protector is designed to compare the feeder circuit and network circuit voltages and if the voltage available from the feeder circuit exceeds the network circuit voltage by a predetermined minimum amount and has the proper phase relationship relative to the network circuit voltage, the network protector closes to restore its associated feeder circuit to active service. This operation of the network protector is commonly referred to as "phasing."

The only commercially successful control device or relay for a network protector has been of the induction type. Although such a control device or relay has excellent sensitivity characteristics and is readily adjustable, numerous applications are available for network protector control devices of simple, reliable and inexpensive construction.

According to the invention, a control device or relay for a network protector includes two translating means which may be thermally responsive or which may operate in response to magnetic forces. Such translating means may take the form of bimetallic thermostats, metallic bellows containing a fluid which varies appreciably in volume or vapor pressure with temperature, or electromagnet devices provided with magnetic armatures. These translating means are connected in opposition so that one translating means, which may be termed a closing translating means, when energized tends to actuate a control device or relay into condition for closing an associated network protector, whereas the remaining translating means of a pair, which may be termed a tripping translating means, when energized tends to actuate the control device or relay into condition for tripping the associated network protector.

Under normal conditions of operation of a secondary network distribution system, each of the translating means is energized in accordance with the resultant of two current components. One current component is controlled by the voltage of the network circuit, whereas the remaining current component is controlled by the current supplied to the network circuit from a network transformer. If current is supplied from the transformer to the network circuit, the directions of flow of the current components are such that the current components add vectorially for energizing the closing translating means and subtract for energizing the tripping translating means. Consequently, the associated network protector remains closed.

Should a fault occur on the associated feeder circuit, current is supplied from the network circuit to the feeder circuit. This reversal in current flow reverses the direction of flow of one of the current components and the current components now add to energize the tripping translating means and subtract to energize the closing translating means. Consequently, the control device or relay operates to trip the associated network protector.

Comparison of the feeder circuit and network circuit voltages preparatory to closing a network protector or "phasing" is effected by energizing the same translating means by two current components which are controlled respectively by voltage of the network circuit and phasing voltage across the poles of the network protector. If conditions are such that closure of the network protector may be assumed reasonably to result in a flow of electrical energy from the associated feeder circuit to the network circuit, the current components add in the closing translating means and subtract in the tripping translating means to actuate the control device or relay into network protector closing condition. However, if the conditions are such that closure of the network protector would not reasonably result in the desired flow of electrical energy, the current components add in the tripping translating means and subtract in the closing translating means and the network protector remains open.

It is, therefore, an object of the invention to provide a relay or network protector having simple, reliable and inexpensive actuating elements.

It is a further object of the invention to provide a relay or network protector having thermally responsive actuating elements.

It is a still further object of the invention to provide a relay or network protector having actuating elements responsive to magnetic forces.

Other objects of the invention will be apparent from the following description taken in conjunction with the accompanying drawings, in which.

Figure 1:
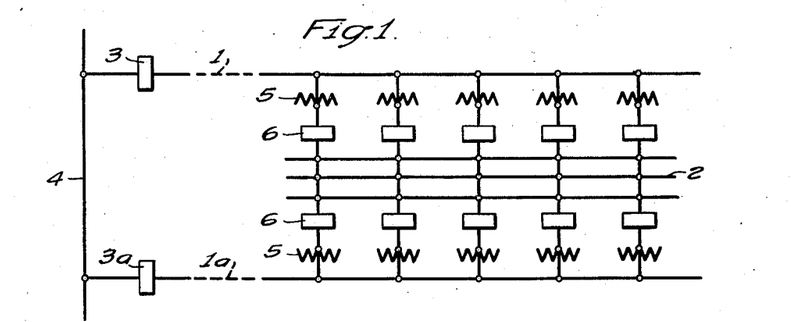
Figure 1 is a schematic view in single line of a secondary network distribution system.

Referring to the drawings, Figure 1 shows a secondary network distribution system having a plurality of feeder circuits represented by two circuits 1 and 1a for energizing a common secondary network circuit or grid 2. It will be understood that the feeder circuits 1 and 1a operate at substantial voltage to supply electrical energy to loads connected to the secondary network circuit 2. Although the feeder circuits 1 and 1a may be energized from separate sources, in the specific embodiment of Fig. 1, these feeder circuits are energized through feeder circuit breakers 3 and 3a from a common source of energy, such as a bus 4. The details of construction and the nature of the source of energy employed for the system of Fig. 1 depend upon local requirements. For example, the system may be single-phase or polyphase and may operate at various frequencies. For the purpose of discussion, it will be assumed that the system of Fig. 1 is an alternating-current system operating at a frequency of 60 cycles per second.

Each of the feeder circuits 1 and 1a is connected through a plurality of suitable coupling devices to the network circuit 2. Each of the coupling devices may include a network transformer 5 and a network protector 6. A suitable network protector 6 and the associated network transformer 5 are shown in greater detail in Fig. 2.

Figure 2:
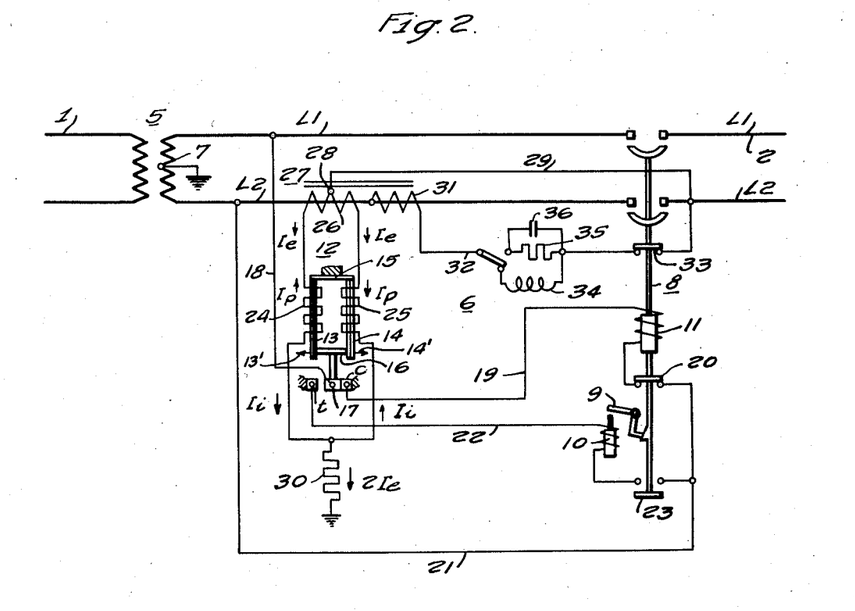
Fig. 2 is a schematic view of a network protector embodying the invention.

In Fig. 2, the network transformer 5 is illustrated as a single-phase transformer having a secondary winding 7 connected to main conductors $L_1$ and $L_2$. The midpoint of the secondary winding 7 may be connected to ground as illustrated, and if desired, the secondary winding may be employed for three-wire service in a manner well understood in the art.

For connecting and disconnecting the feeder circuit 1 relative to the network circuit 2, each network protector 6 includes a circuit breaker 8 having a tripping latch 9, a tripping solenoid 10 and a closing motor or solenoid 11. The operation of the circuit breaker 8 is controlled by a control device or relay 12.

The relay 12 includes two translating means, each of which when energized by electrical current, is designed to provide an output for assisting in the control of the circuit breaker 8. Preferably, the translating means is designed to provide an output proportional to the square of its energizing current. In the specific example of Fig. 2, the translating means take the form of bimetallic thermostats 13 and 14, which are connected to a fixed support 15. The free ends of the thermostats are connected by a bridging member 16 which carries a movable electrical contact 17.

Movement of the movable contact 17 in one direction carries the contact into engagement with a closing contact c for controlling the closing of the circuit breaker 8. The closing circuit thus established may be traced from the conductor $L_1$ through a conductor 18, the movable contact 17, the closing contact c, a conductor 19, the closing motor or solenoid 11, back contacts of a pallet switch 20 carried by the circuit breaker, and a conductor 21 to the conductor $L_2$.

Movement of the movable contact in the opposite direction may be employed for tripping the circuit breaker 8. Such tripping may be effected by positioning the movable contact 17 to engage mechanically the tripping latch 9 in order to trip the circuit breaker. For the purpose of illustration, however, the movable contact 17 in such movement engages a tripping contact t for establishing a tripping circuit for the tripping solenoid 10. This tripping circuit may be traced from the conductor $L_1$, through the conductor 18, the movable contact 17, the tripping contact t, a conductor 22, the tripping solenoid 10, front contacts of a pallet switch 23 carried by the circuit breaker 8, and the conductor 21 to the conductor $L_2$.

Heat may be applied to the thermostats 13 and 14 in any suitable manner. For example, electrical current may be conducted directly through the respective thermostats to develop heat therein in cooperation with the internal resistance of the thermostats. However, in Fig. 2, the thermostats are heated by independent heaters 24 and 25.

The thermostats 13 and 14 are designed when heated to tend to move in opposite directions. These directions may be such that the thermostats tend to move either toward each other or away from each other. In the specific example illustrated in Fig. 2, the thermostats 13 and 14 when heated tend to move respectively in the directions of the arrows 13' and 14'. Therefore, ambient temperature variations have substantially no effect on the operation of the relay 12. It will be noted that the two thermostats are connected by means of the bridging element 16. Consequently, the direction of movement of the movable contact 17 and the bridging element 16 depends upon which of the thermostats develops the greater force. Since the thermostat 13 when heated tends to urge the movable contact 17 towards the tripping contact t, the thermostat may be termed a tripping thermostat. The thermostat 14 is termed a closing thermostat for the reason that when heated it tends to urge the movable contact 17 towards the closing contact c. In its actual movement, the movable contact 17 is differentially responsive to the forces developed by the thermostats.

By suitable energization of the thermostats 13 and 14, the control device 12 may be operated as a directional relay. To this end, the heaters 24 and 25 are connected in a series circuit with a secondary winding 26 of a current transformer 27. It will be noted that the current transformer 27 has its primary winding associated with the conductor $L_2$. For this reason, the current component $I_1$ flowing in the series circuit including the heaters 24 and 25 is proportional to the current flowing in the conductor $L_2$.

The heaters 24 and 25 also are connected in parallel for energization in accordance with the voltage of the network circuit 2. Such energization may be provided by connecting a centrally disposed tap 28 on the secondary winding 26 to the conductor $L_2$ by means of a conductor 29. The circuit for energizing the heaters in accordance with the network circuit voltage is completed by a resistor 30. By inspection of the circuit illustrated in Fig. 2, it will be noted that the voltage between the conductor $L_2$ and ground of the network circuit produces a current component $I_e$ in each of the heaters 24 and 25.

The directional operation of the control device 12 may be understood more clearly by a brief analysis of its operation. Assuming that the circuit breaker 8 is closed, a current flows through the conductor $L_2$ which produces a substantially in-phase current component $I_1$ which flows in series through the heaters 24 and 25.

Since the heaters 24 and 25 and the resistor 30 offer substantially a resistance load to the current component $I_e$ which is supplied through the conductor 29, it follows that this current is substantially in phase with the voltage between the conductor $L_2$ and ground. Since each half of the secondary winding 26 carries a current $I_e$ flowing in opposite directions, the winding offers substantially no inductance to such current.

Assuming further that the system is operating at unity power factor, the direction of flow of the current components $I_1$ and $I_e$ is such that they add directionally in one of the heaters and subtract directionally in the other heater. For the purpose of this discussion, it will be assumed first that current flows from the network circuit 2 to a fault on the feeder circuit 1. The instantaneous directions of flow of the current components are shown by arrows in Fig. 2. With the directions of flow as indicated, the current components $I_1$ and $I_e$ add in the heater 24 and subtract in the heater 25. Consequently, the thermostat 13 develops a greater force than that of the thermostat 14 and urges the movable contact 17 into engagement with the tripping contact $t$ to trip the circuit breaker 8. Since the assumed direction of energy flow is from the network circuit 2 to the feeder circuit 1, tripping of the circuit breaker 8 is required and the relay 12 performs this tripping operation.

Let it be assumed next that current flows in its normal direction from the feeder circuit 1 to the network circuit 2. Under such conditions, the direction of flow of current in the conductor $L_2$ relative to the voltage reverses. Consequently, the current components $I_e$ and $I_1$ now add in the heater 25 and subtract in the heater 24. Since the resultant current flowing through the heater 25 is greater, the closing thermostat 14 develops a greater force than the thermostat 13 and urges the movable contact 17 towards the closing contact c. Therefore, the circuit breaker 8 remains closed, which is desired under the assumed conditions.

If the network distribution system operates at other power factors, the current components still add or subtract vectorially in analogous manners to provide directional relay operation. As above indicated, the resistive character of the load provided by the heaters 24 and 25 and the resistor 30 provides a current component $I_e$ which is substantially in phase with the voltage of the network circuit. Since the current components $I_e$ and $I_1$ are substantially in phase with voltage and current of the network system, the relay 12 develops substantially a watt characteristic. If other characteristics are desired, the resistor 30 may be altered or replaced by a suitable reactance or impedance to provide the desired relationship between the current components.

The foregoing brief discussion of the relay 12 indicates that the relay exhibits directional characteristics. A more comprehensive analysis of the relay will be found in my copending application Serial No. 388,080, filed on the same date herewith, and assigned to the same assignee as the present application.

As previously indicated, it is desirable that the network protector not only trip in response to a reversal of current therethrough, but that the network protector close when the voltage conditions on the feeder and network circuits are such that the feeder circuit is in condition for supplying electrical energy to the network circuit. This additional phasing operation is provided in the network protector of Fig. 2 by the same relay 12. By reference to Fig. 2 it will be noted that when the circuit breaker 8 is opened no current component $I_1$ flows through the heaters 24 and 25. However, since the conductor 29 connects the secondary winding 26 of the current transformer 27 to the network circuit side of the circuit breaker 8, the current component $I_e$ continues to flow through the heaters from an energized network circuit. Phasing operation of the relay 12 under these conditions is provided by a phasing current component $I_p$ which flows through the heaters 24 and 25.

This phasing current component $I_p$ may be produced in various ways. As illustrated in Fig. 2, the current transformer 27 is provided with an auxiliary or additional secondary winding 31 which is inductively coupled to the secondary winding 26. In a specific embodiment of the invention, the auxiliary winding 31 may have one terminal connected to the main conductor $L_2$. The remaining terminal of the auxiliary winding is connected through a conductor 32 and back contacts of a pallet switch 33 carried by the circuit breaker 8 to the main conductor $L_2$ on the network circuit side of the circuit breaker. From an inspection of Fig. 2, it will be noted that the auxiliary winding 31 is energized in accordance with voltage across the poles of the open circuit breaker 8.

Since the auxiliary winding 31 is inductively coupled to the secondary winding 26, current flowing through the auxiliary winding 31 produces a phasing current component $I_p$ in the circuit including the heaters 24 and 25. This phasing current component $I_p$ is controlled by the voltage across the poles of the open circuit breaker 8. Assuming first that the phasing voltage across the poles of the circuit breaker 8 is in phase with the network circuit voltage, and that the current components $I_e$ and $I_p$ are in phase respectively with the network circuit and phasing voltages, the current components $I_e$ and $I_p$ flow in such directions that they add vectorially in one of the heaters and subtract in the other of the heaters.

Since the direction of flow of the phasing current component $I_p$ depends upon the relationship of the feeder circuit voltage to the network circuit voltage, the energizing circuits for the relay 12 may be so designed that the current components add in the heater 25 and subtract in the heater 24 when the voltage conditions are such as to assure reasonably a flow of energy from the feeder circuit to the network circuit. With such energization of the heaters, the movable contact 17 is actuated into engagement with the closing contact c to complete a closing circuit for the circuit breaker 8.

On the other hand, if the network system conditions are such that electrical energy would flow from the network circuit to the feeder circuit upon closure of the circuit breaker 8, as in the case in which the network circuit voltage exceeds the voltage on the feeder circuit side of the circuit breaker 8, the current components $I_e$ and $I_p$ flow in such directions that the current components add in the heater 24 and subtract in the heater 25. This results in a movement of the movable contact 17 towards the tripping contact t and prevents closure of the circuit breaker 8.

Maximum response of the relay 12 under phasing conditions is obtained when the current components $I_e$ and $I_p$ are either in phase or 180° out of phase. If the circuit through which phasing current flows is highly inductive, the phasing current lags the phasing voltage across the poles of the circuit breaker 8 by substantially 90°. Under these conditions, the maximum response of the relay 12 is obtained when the phasing voltage across the poles of the circuit breaker 8 leads the network voltage by approximately 90°. This is the characteristic which is generally required for phasing relays employed on network protectors.

The characteristic of the relay 12 may be modified readily. For example, if the circuit offered to phasing current possesses insufficient inductance, additional inductance 34 may be placed in series with the auxiliary winding 31. On the other hand, a resistor 35 may be placed in series with the auxiliary winding 31 to bring the phasing current substantially in phase with the phasing voltage. With such a resistor in circuit, the response of the relay 12 is substantially a watt response; that is, maximum response of the relay is obtained when the phasing voltage across the poles of the circuit breaker 8 and the network voltage are either in phase or 180° out of phase. A further modification of the phase angle characteristics of the relay 12 may be obtained by placing a capacitor 36 in parallel with the resistor 35. Consequently, by suitable selection of the nature and magnitude of the impedance in series with the auxiliary winding 31, the phase angle characteristics of the relay 12 may be modified as desired. Since the phase angle characteristics may be modified by 180° by reversal of the terminal connections of the auxiliary winding 31, it will be appreciated that complete control of the phase angle characteristics is provided for the relay 12.

From the foregoing discussion, it is believed that the operation of the network protector illustrated in Fig. 2 is apparent. Assuming that the parts are in the condition illustrated in Fig. 2, it will be noted that the tripping circuit for the tripping solenoid 10 is interrupted at the pallet switch 23. The pallet switch 20, which controls the energizing circuit for the closing solenoid 11, is closed and the pallet switch 33, which controls energization of the auxiliary winding 31, also is closed. Consequently, the auxiliary winding 31 is energized in accordance with the phasing voltage across the poles of the circuit breaker 8 and a phasing current component $I_p$ flows through the heaters.

If the network circuit 2 is unenergized, no current component $I_e$ flows through the heaters 24 and 25. Consequently, the heaters are energized equally by the phasing current component $I_p$. Such heating causes the movable contact 17 to take up its equilibrium position which may be either in contact with the closing contact c or out of contact therewith, depending upon the setting of the relay 12. Consequently the circuit breaker 8 either remains open or closed, depending upon the aforesaid setting of the relay 12. This setting will be discussed in greater detail below.

If the network circuit 2 is energized, a current component $I_e$ flows through each of the heaters 24 and 25. Assuming that the phasing conditions across the poles of the circuit breaker 8 are such that closure of the circuit breaker would result in a flow of electrical energy from the network circuit 2 to the feeder circuit 1, the direction of flow of the current components $I_e$ and $I_p$ is such that the resultant of the current components in the heater 24 is greater than the resultant in the heater 25. Consequently, the relay 12 is actuated to carry the movable contact 17 away from the closing contact c and the circuit breaker 8 remains open.

In the event that phasing conditions across the poles of the circuit breaker 8 are such that closure of the circuit breaker would result in a flow of electrical energy from the feeder circuit 1 to the network circuit 2, the direction of flow of the current components $I_e$ and $I_p$ is such that the resultant of the current components flowing through the heater 25 is greater than the resultant of the current components flowing through the heater 24. Consequently, the movable contact 17 moves into engagement with the closing contact c to complete a closing circuit for the circuit breaker 8.

Closure of the circuit breaker 8 operates to open the pallet switches 20 and 33, which interrupt the closing circuit for the closing solenoid 11 and the energizing circuit for the auxiliary winding 31. Closure of the circuit breaker also closes the pallet switch 23 to place the tripping circuit for the solenoid 10 in condition for operation.

With the circuit breaker closed, current flows from the feeder circuit 1 to the network circuit 2. This flow of current produces in the heaters a current component $I_1$. The direction of flow of the current $I_1$ is such that the resultant of the current components $I_e$ and $I_1$ is greater in the heater 25 than in the heater 24. Therefore, the movable contact 17 moves into engagement with the closed contact c and the circuit breaker 8 remains closed. These conditions obtain even though a fault occurs on the network circuit 2 and an excessive current flows from the feeder circuit 1 to the fault on the network circuit. Under these circumstances, the maximum capacity of all the feeder circuits is available for burning clear the fault on the network circuit.

However, should a fault occur on the feeder circuit 1, the direction of energy flow is from the network circuit 2 to the feeder circuit 1. For such a flow of energy the resultant of the current component $I_e$ and $I_1$ is greater for the heater 24 than for the heater 25. For this reason, the greater force developed by the tripping thermostat 13 moves the movable contact 17 into engagement with the tripping contact $t$ and completes a tripping circuit for the circuit breaker 8. From a consideration of the foregoing brief résumé of the operation of the system illustrated in Fig. 2, it will be observed that the relay 12 provides adequate control for a network protector.

Figure 3:
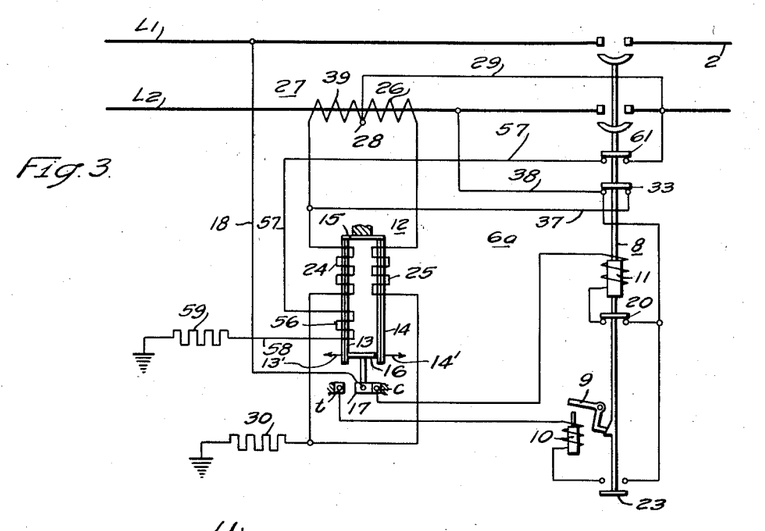
Figs. 3 and 4 are diagrammatic views showing modifications of the network protector illustrated in Fig. 2.

In the system of Fig. 2, an auxiliary winding 31 is provided for phasing purposes. If desired, this auxiliary winding 31 may be omitted. A system wherein the auxiliary winding 31 is omitted is illustrated in Fig. 3. Except for the omission of the auxiliary winding 31 and its energizing circuit, the system of Fig. 3 is substantially the same as that of Fig. 2 and similar parts are designated by similar reference characters.

The directional tripping operation of the relay 12 of Fig. 3 is exactly the same as that of the relay shown in Fig. 2. However, in order to provide phasing control for the network protector 6a of Fig 3, the secondary winding 26 of the current transformer 27 is designed to serve as an auto-transformer. To this end one terminal of the secondary winding 26 is connected through a conductor 37, the pallet switch 33 and a conductor 38 to the main conductor $L_2$ on the feeder circuit side of the circuit breaker 8. Consequently, the phasing voltage across the poles of the circuit breaker 8 is applied across a portion 39 of the secondary winding 26. This portion 39 serves as the primary of an auto-transformer wherein the entire secondary winding 26 constitutes the secondary of the auto-transformer. For this reason, when the circuit breaker 8 is open, the secondary winding 26 produces a phasing current component $I_p$ in the heaters 24 and 25 which is controlled by the phasing voltage across the poles of the circuit breaker 8. Except for the method of generating the phasing current component, the operation of the system of Fig. 3, which has thus far been described, is similar to that of the system illustrated in Fig. 2.

Since the auxiliary winding 31 of Fig. 2 is an independent winding, the windings may be designed for any desired ratio of transformation. However, since the winding 26 in Fig. 3 is employed both as the secondary of the current transformer 27 and as an auto-transformer, the ratio of transformation of the winding 26 when employed as an auto-transformer must be substantially 2.

Figures 4, 5:
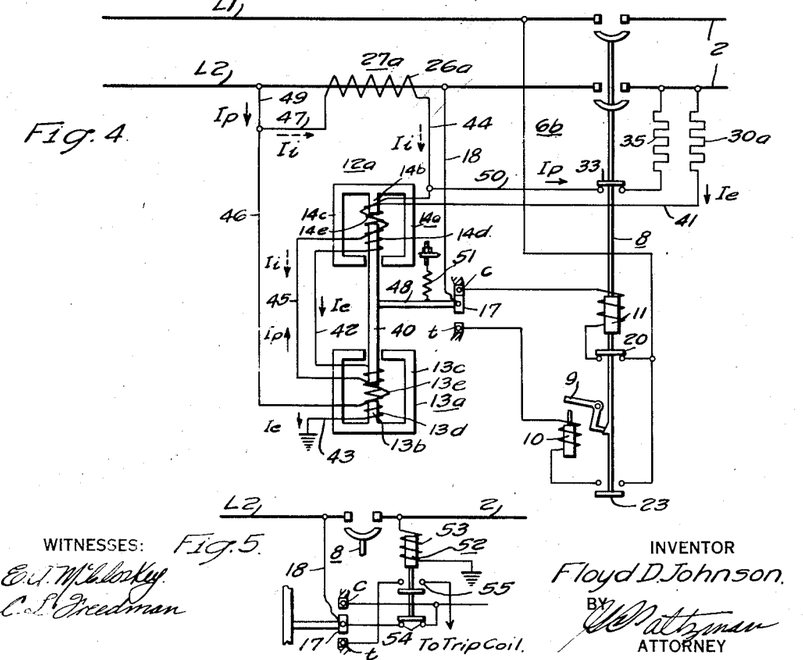
Fig. 5 is a schematic detailed view of an auxiliary control device for network protectors.

As pointed out in my aforesaid copending application, the thermostats 13 and 14 of Figs. 2 and 3 may be replaced by other translating devices. For example, instead of thermal responsive devices, such as thermostats, magnetic devices may be employed. In Fig. 4 a modified protector 6b employing magnetic devices is illustrated.

Referring to Fig. 4, a relay 12a is disclosed which includes two translating means in the form of magnetic devices 13a and 14a. Each magnetic device includes a pole piece 13b and 14b and magnetic flux return arms 13c and 14c.

Both magnetic devices 14a and 13a operate on a common armature element 40 mounted for reciprocation between the poles 13b and 14b. The various magnetic paths including the poles 13b and 14b, the arms 13c and 14c and the armature 40, may be constructed of a suitable soft magnetic material such as laminated soft iron.

Each of the magnetic devices is provided with a voltage winding 13d and 14d, which is connected for energization in accordance with the voltage of the network circuit 2. The energizing circuit for these windings may be traced from the network circuit side of the conductor $L_2$ through a resistor 30a, a conductor 41, the voltage winding 14d, a conductor 42, the voltage winding 13d and a conductor 43 to ground. An instantaneous direction of flow for the current component $I_e$ produced by the network circuit voltage is indicated by arrows.

Each of the magnetic devices also carries a current winding 13e or 14e, which is energized in accordance with current flowing through the conductor $L_2$ or in accordance with phasing voltage across the poles of the circuit breaker 8, depending upon the condition of the circuit breaker. The circuit for energizing the current windings 13e and 14e in accordance with current flowing through the conductor $L_2$ may be traced from a current transformer 27a which is associated with the conductor $L_2$. Current from one terminal of the secondary winding 26a of the transformer 27a flows through a conductor 44, the current winding 14e, a conductor 45, the current winding 13e, a conductor 46 and a conductor 47 back to the remaining terminal of the secondary winding of the current transformer. The instantaneous direction of flow of the current component $L_1$ produced by energization of the current transformer 27a is indicated in Fig. 4 by arrows.

Movement of the armature element 40 is employed for controlling movement of the movable contact 17. The movable contact may be carried by a pin 48 attached to the armature element 40.

When the circuit breaker 8 is closed, it will be observed that each of the magnetic devices 13a and 14a is energized in accordance with a current component $I_1$ flowing through current windings 14e or 13e, and by a current component $I_e$ flowing through the voltage winding 14d or 13d. Each of these windings produces magnetic flux flowing through the magnetic paths provided by the associated magnetic devices. These magnetic fluxes in each magnetic device add or subtract vectorially in accordance with the phase relationships of the currents flowing through the windings thereof. The relationship of parts and the directions of current flow in the windings, are such that when current flows in a normal direction from the feeder circuit to the network circuit 2, the resultant of the magnetic fluxes in the magnetic device 14a exceeds the resultant of the magnetic fluxes in the magnetic device 13a. Under such conditions, the pull exerted by the magnetic device 14a on the armature element 40 exceeds that exerted by the magnetic device 13a and the movable contact 17 is actuated towards the closing contact $c$. Therefore, the circuit breaker 8 remains closed.

Should the flow of electrical energy in the network system reverse, the resultant of the magnetic fluxes in the magnetic device 13a exceeds that of the magnetic device 14a and the movable contact 17 consequently moves into engagement with the tripping contact $t$ to trip the circuit breaker 8. From this short discussion, it will be observed that the directional tripping characteristics of the relay 12a are similar to those of the relay 12 of Figs. 2 and 3.

Since the path offered by the relay 12a to the current component $I_e$ is highly inductive, the value of resistance of the resistor 30a may be selected to bring the current component $I_e$ substantially into phase with the network circuit voltage. Such a phase relationship provides substantially the same directional tripping performance of the relay 12a as was obtained for the relays 12 of Figs. 2 and 3. In accordance with the discussion of Fig. 2, the characteristics of the relays 12a may be modified by varying the value of the resistor 30a or by employing a reactive impedance of the desired type and value in series with the voltage windings 13d and 14d.

When the circuit breaker 8 is open, the current windings 14e and 13e are connected across the poles of the circuit breaker 8 by a circuit which may be traced from the conductor $L_2$ on the feeder circuit side of the circuit breaker 8 through a conductor 49, the conductor 46, the current winding 13e, the conductor 45, the current winding 14e, a conductor 50, and the back contacts of the pallet switch 33 to the conductor $L_2$ on the network circuit side of the circuit breaker. Therefore, a phasing current component $I_p$ flows when the circuit breaker is open, which is controlled by the phasing voltage across the poles of the circuit breaker 8. An instantaneous direction of flow for the phasing current component is indicated by arrows in Fig. 4. Since the current windings 13e and 14e offer inductive reactance to the phasing current component $I_p$, it may be desirable to employ a suitable impedance, such as the resistor 35, in the phasing current circuit in order to control the characteristics of the relay 12a. If a resistor 35 is employed, the phasing current component $I_p$ may be brought substantially in phase with the phasing voltage across the poles of the circuit breaker in the manner outlined with reference to Fig. 2. Other characteristics may be obtained by suitable selection of the nature and value of the impedance represented by the resistor 35.

As previously pointed out, the relay 12a is so designed that when currents flow through the voltage windings 13d and 14d and through the current windings 13e and 14e, the magnetic fluxes produced by the currents add in one of the magnetic devices and subtract in the other magnetic device, assuming that the currents are in phase. For other phase relationships, the magnetic fluxes produced by the currents add or subtract vectorially to produce a resultant force in each of the magnetic devices. Depending upon the particular magnetic devices in which the magnetic currents add the movable contact 17 moves into engagement with the closing contact c or the tripping contact t.

When the circuit breaker 8 of Fig. 4 is closed, the current windings 14e and 13e are energized in accordance with current passing through the conductor $L_2$. When the circuit breaker is open, the current windings 13e and 14e are energized in accordance with the phasing voltage across the poles of the circuit breaker 8. It will be noted that when the circuit breaker 8 is open, the circuit for the phasing current $I_2$ includes the secondary winding 26a of the current transformer, which constitutes one arm of a parallel circuit, the other arm being formed by the current windings 13e and 14e in series. However, since the secondary winding 26a possesses substantial impedance, little phasing current flows therethrough. For this reason, it is convenient to ignore the secondary winding 26a in considering the phasing operation of the relay 12a. It is believed that the basic operation of the relay 12a will be apparent from the preceding discussion of the operation of the relay 12 of Fig. 1.

In Fig. 4 a spring 51 is provided for partially compensating for the weight of the armature element 40. If desired, this spring may be adjustable. Since the spring compensates for part only of the weight of the armature element 40, the movable contact 17 and the closing contact c are disengaged when the magnetic devices 13a and 14a are deenergized, or when these devices are energized only by the current component $I_e$. Preferably the position of the armature element under these conditions should be substantially midway between the pole pieces 13b and 14b.

In order to complete the closing circuit for the circuit breaker 8, a definite phasing current component $I_p$ must flow through the current windings 13e and 14e, and the phasing current component must flow in response to a proper phasing voltage across the poles of the circuit breaker. This operation is in accordance with the desired practice requiring a proper phasing voltage to be present before the circuit breaker 8 closes.

The relay 12a as thus far described, does not assure closure of the circuit breaker 8 when the network circuit 2 is deenergized. Under these conditions, no current component $I_e$ flows in the voltage windings 13d and 14d. Although a phasing current component $I_p$ may flow, this phasing current component alone would develop equal forces in the magnetic devices 13a and 14a and consequently, would not affect substantially the position of the movable contact 17.

If it is desired that the circuit breaker 8 close when the network circuit 2 is deenergized or dead, the bias exerted by the spring 51 may be increased sufficiently to maintain the movable contact 17 in engagement with the closing contact c when the relay 12a is completely deenergized. This will assure closure of the circuit breaker 8 when the network circuit is deenergized. If a definite phasing voltage is required prior to closure of the circuit breaker 8 on an energized network, the voltage winding 13d may be designed with a slightly greater number of turns than the voltage winding 14d. With the network circuit 2 energized, the current component $I_e$ flowing through the unbalanced voltage coils 13d and 14d produces a resultant force in the magnetic devices 13a and 14a operating to move the movable contact 17 away from the closing contact c against the bias of the spring 51. Therefore, in order to close the circuit breaker 8 on an energized network, a definite phasing current component $I_p$ must flow.

Closure of the circuit breaker 8 on a deenergized or dead network circuit also may be assured by the modification illustrated in Fig. 5. In Fig. 5, an under-voltage relay 52 has its energizing coil 53 connected to the network circuit for energization in accordance with the voltage thereof. If the network circuit 2 is deenergized, the under-voltage relay 52 drops to close a pair of back contacts 54. The back contacts 54 are designed to establish a by-pass circuit between the movable contact 17 and the closing contact c. Therefore, when the network circuit 2 is deenergized, a closing circuit for the circuit breaker 8 is completed, regardless of the position of the movable contact 17. With the construction illustrated in Fig. 5, the movable contact 17 may be adjusted to remain out of contact with the closing contact c when the relay is completely deenergized. Consequently, when the network circuit 2 is energized, a definite phasing voltage must be present before the movable contact 17 can be actuated into engagement with the closing contact c.

If desired, the undervoltage relay 52 may carry a pair of front contacts 55 which are connected in the tripping control circuit of the circuit breaker 8. With such a construction, the undervoltage relay 52 opens the circuit associated with the tripping contact whenever the network circuit 2 is deenergized.

As representative of suitable voltage ranges for the relay 52, the relay may be designed to drop out and close its back contacts when the network circuit voltage drops below 30% of its normal value and may be designed to pick up and open its back contacts when the voltage reaches 45% of its normal value.

A still further modification for assuring closure of the circuit breaker 8 on the deenergized or dead network is illustrated in Fig. 3. In Fig. 3, the relay 12 may be designed to maintain its movable contact 17 in engagement with the closing contact c when the relay is completely deenergized. In order to assure the requirement of a definite phasing voltage when the network circuit 2 is energized, the tripping thermostat 13 of the relay 12 is provided with a small auxiliary heater 56. This auxiliary heater is energized in accordance with the voltage of the network circuit 2 by a circuit which may be traced from the conductor L₂ of the network circuit through a conductor 57, the auxiliary heater 56, and a conductor 58, to ground. If desired, a suitable current limiting impedance, such as a resistor 59, may be included in series with the auxiliary heater 56. The auxiliary heater is so proportioned that when the network circuit 2 is energized, sufficient current passes through the auxiliary heater to urge the movable contact 17 away from the closing contact c. In order to close the circuit breaker on an energizing network, a definite phasing current must flow to urge the movable contact 17 into engagement with the closing contact c.

In some cases the unbalance caused by the auxiliary heater 56 may be undesirable when the circuit breaker 8 is closed and the relay 12 is operating as a directional relay. In such cases back contacts of a pallet switch 61 may be included in the circuit of the auxiliary heater to open the circuit when the circuit breaker closes. By the provision of the pallet switch on the circuit breaker operating to close or open the auxiliary heater circuit when the circuit breaker opens or closes, the relay 12 may be given an operating characteristic which varies in accordance with the condition of the circuit breaker.

The modifications thus far described have been for single-phase distribution systems. If similar relays are desired for polyphase systems, one relay may be provided for each phase of the polyphase system. All closing contacts of the relays then may be placed in series for controlling the closing of the associated polyphase circuit breaker, whereas the tripping contacts of the relays could be placed in parallel for independently controlling the tripping of the circuit breaker. Also, if desired, the relays provided for the various phases of a polyphase system may have their movable parts mechanically connected for actuating a common movable contact into engagement with a closing contact or a tripping contact. A network protector 6c for a polyphase system is illustrated in Fig. 6.

Figure 6:
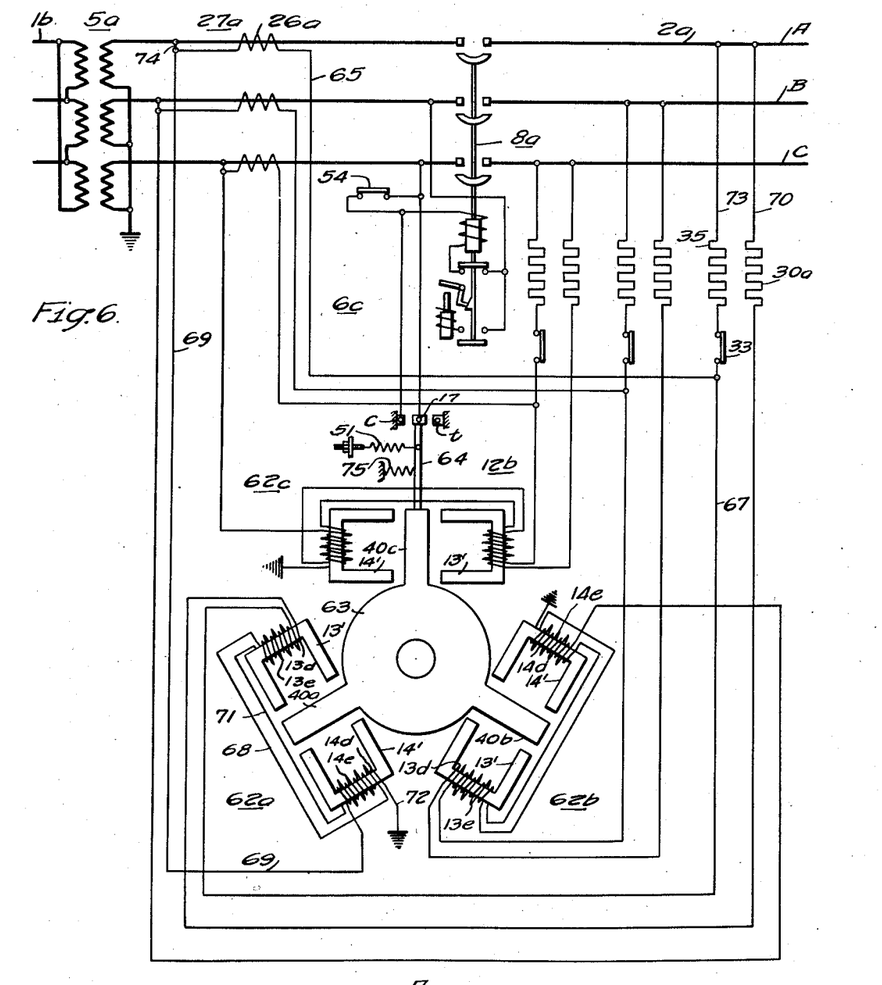
Fig. 6 is a schematic view of a three-phase network protector embodying the invention.

Referring to Fig. 6, a feeder circuit 1b is shown connected to the primary windings of a network transformer 5a. For a three-phase system, the primary of the transformer 5a may be connected in delta, whereas the secondary windings may be connected in star with grounded neutral. The secondary windings are connected through a three-phase circuit breaker 8a to a secondary network circuit 2a. The various phase conductors are designated by the reference characters A, B and C. It will be understood that with the system illustrated in Fig. 6, three-wire or four-wire service is available. In other words, service may be obtained from the three-phase conductors A, B and C or loads may be connected between any of the phase conductors and ground.

In order to control the circuit breaker 8a, a relay 12b is provided which includes three operating units 62a, 62b and 62c. These three units operate on a common armature member 63 having armature elements 40a, 40b and 40c associated with the various units. The armature member 63 also carries the movable contact 17 which may be connected thereto by a suitable pin 64. From an inspection of Fig. 6, it will be noted that movement of the armature member 63 carries the movable contact 17 into engagement with the tripping contact t or the closing contact c. Since the units 62a, 62b and 62c are similar in construction, a brief description of one unit 62a is believed to suffice.

The unit 62a includes two magnetic devices 13' and 14' which correspond to the magnetic devices 13a and 14a of Fig. 4. However, the shape of the magnetic devices 13' and 14' is slightly different in order to simplify the construction of a polyphase relay. In the construction of Fig. 6, the magnetic devices 13' and 14' are substantially U-shaped. The voltage windings 13d and 14d and current windings 13e and 14e are associated with the magnetic devices 13' and 14'. These voltage and current windings are associated with the phase conductor A of the polyphase distribution system in a manner analogous to the connection of the windings to the distribution system of Fig. 4. For example, the current windings 13e and 14e are connected to the secondary winding 26a of the current transformer 27a which is associated with the phase conductor A. This circuit may be traced from one terminal of the secondary winding 26a through a conductor 65, a conductor 67, the current winding 13e, a conductor 68, the current winding 14e and the conductor 69 back to the remaining terminal of the secondary winding 26a. Similarly the voltage windings are energized from the phase conductor A by a circuit which may be traced from the phase conductor A through a conductor 70, the voltage winding 13d, a conductor 71, the voltage winding 14d, and a conductor 72 to ground. If desired, an impedance represented by the resistor 30a may be included in the circuit of the voltage windings for controlling phase relationships.

When the circuit breaker 8a is open, the current windings 13e and 14e operate as phasing current windings in a manner analogous to that of the windings in Fig. 4. For example, these windings are associated with phase A of the distribution system by a circuit which may be traced from the phase conductor A on the network side of the circuit breaker 8a through a conductor 73, the back contacts of the pallet switch 33 which is carried by the circuit breaker 8a, the conductor 67, the current winding 13e, the conductor 68, the current winding 14e, the conductor 69 and a conductor 74 to the phase conductor A on the feeder circuit side of the circuit breaker 8a. If desired, an impedance represented by the resistor 35 may be included in the phasing current circuit of the current winding for controlling the phase relationships thereof. Since the unit 62a of Fig. 6 is substantially similar in operation to the relay 12a of Fig. 4, it is believed that a detailed description of the operation thereof is unnecessary.

The units 62b and 62c are substantially similar to the unit 62a but are associated respectively with the phase conductors B and C. From the description of the unit 62a, it is believed that the connections for the units 62b and 62c may be traced readily.

In Fig. 6 the spring 51 is employed for biasing the movable contact 17 away from the tripping contact t. The spring 51 urges the movable contact 17 into engagement with a stop which may be in the form of a somewhat stronger spring 75. This stop spring 75 is designed to maintain the movable contact 17 in a centrally disposed position between the closing and tripping contacts c and t. Consequently, in order to move the movable contact 17 into engagement with the closing contact c, definite phasing voltage must be present across the poles of the circuit breaker 8a. It will be understood that each of the magnetic devices 13′ when energized tends to urge the armature member 63 in a clockwise direction as viewed in Fig. 6, to bring the movable contact 17 into engagement with the tripping contact t. Each of the magnetic devices 14′ when energized tends to urge the armature member 63 in a counter-clockwise direction as viewed in Fig. 6, to bring the movable contact 17 for engagement with the closing contact c.

If desired, the coil 53 of undervoltage relay 52, which is represented in Fig. 6 by its contacts, may be employed for assuring closure of the circuit breaker 8a on a deenergized or dead network circuit 2a.

When a plurality of polyphase units such as the units 62a, 62b and 62c operate on a common armature member the frequency of vibration imparted to the armature member by reason of the alternating character of the currents flowing in the units is substantially higher than the frequency of vibration for a single-phase unit such as that illustrated in Fig. 4. For this reason, the damping required for controlling vibration of the armature member 63 is somewhat less difficult to provide than that required for controlling the vibration of the armature element 40 of Fig. 4.

Figure 7:
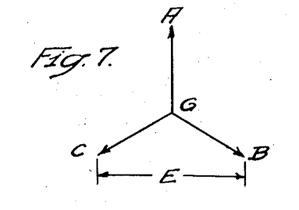
Fig. 7 is a vector diagram representing phase relationships in a three-phase circuit.

In Fig. 6, impedance such as the resistor 30a is employed for controlling the phase relationship of current flowing in the associated voltage windings. By proper utilization of the phase relationship present in the polyphase system, it is possible to eliminate such a resistor. For example, in Fig. 7, the voltage vectors A, B and C for the three-phase system of Fig. 6 are illustrated conventionally. It will be noted that the voltage to ground GA of the phase A conductor is displaced 90° from the voltage E present between the phase conductors B and C. Consequently, if a voltage corresponding to the voltage E is applied to an inductive circuit, the resultant current flowing therein will be either in phase with, or 180° displaced from, the voltage represented by the vector GA. Let it be assumed that the voltage windings 13d and 14d of the unit 62a are connected for energization across the phase conductors B and C. Since these windings offer an inductive path to ground, the resulting current component $I_e$ flowing therethrough is displaced substantially 90° from the voltage E across the phase conductors B and C. Such a displacement brings the current component $I_e$ into phase or phase opposition with the voltage GA depending upon the particular circuit connections. Since the current windings 13e and 14e are energized in accordance with phase A current, the current flowing therein at unity power factor is substantially in phase with the voltage GA. With energization derived in this manner, the current flowing in the voltage and current windings will be substantially in phase at unity power factor and will vary in displacement in accordance with variations in power factor of the distribution system. Consequently, if it is desired to eliminate or reduce the resistor 35, the voltage windings of the unit 62a may be connected across the phase conductors B and C and corresponding connections may be made for the remaining units 62b and 62c.

Although the invention has been described with reference to certain embodiments thereof, numerous modifications are possible. Therefore, the invention is to be restricted only by the appended claims.

I claim as my invention:

1. In an electrical distribution system, an electrical circuit, a circuit breaker for connecting and disconnecting portions of said circuit, a pair of operating means, means differentially responsive to said operating means for controlling said circuit breaker, and energizing means for said operating means, said energizing means including means effective when said circuit breaker is in circuit connecting condition for energizing said operating means respectively in accordance with the sum and difference of current and voltage present in said electrical circuit, and means effective when said circuit breaker is in circuit disconnecting condition for energizing said operating means respectively in accordance with the sum and difference of voltage present in said circuit on one side of said circuit breaker and voltage between said portions of said electrical circuit.

2. In an electrical distribution system, a feeder circuit, a network circuit, and a plurality of coupling devices for coupling said feeder circuit to said network circuit each including a circuit breaker for controlling the connection and disconnection of said feeder circuit relative to said network circuit, a pair of translating means each effective for producing an output dependent on its energization, means differentially responsive to said outputs for operating said circuit breaker, means effective when said circuit breaker is in circuit connecting condition for selectively energizing one of said translating means in accordance with the sum or difference of voltage and current present in said system dependent on the direction of energy flow in said system, and means effective when said circuit breaker is in circuit disconnecting condition for selectively energizing one of said translating means in accordance with the sum or difference of voltage in one of said circuits and voltage across a pole of said circuit breaker dependent on the value of said feeder circuit voltage relative to said network circuit voltage.

3. In an electrical distribution system, a feeder circuit, a network circuit, and a plurality of coupling devices for coupling said feeder circuit to said network circuit each including a circuit breaker for controlling the connection and disconnection of said feeder circuit relative to said network circuit, a pair of translating means each effective for producing an output dependent on its energization, means differentially responsive to said outputs for operating said circuit breaker, means effective when said circuit breaker is in circuit connecting condition for selectively energizing said translating means respectively in accordance with the sum and difference or in accordance with the difference and sum of voltage and current present in said system dependent on the direction of energy flow in said system, and means effective when said circuit breaker is in circuit disconnecting condition for selectively energizing said translating means respectively in accordance with the sum and difference or in accordance with the difference and sum of voltage in one of said circuits and voltage across a pole of said circuit breaker dependent on the value of said feeder circuit voltage relative to said network circuit voltage.

4. In an electrical distribution system, a feeder circuit, a network circuit, and a plurality of coupling devices for coupling said feeder circuit to said network circuit each including a circuit breaker for controlling the connection and disconnection of said feeder circuit relative to said network circuit, control means operable into a first condition for tripping said circuit breaker and into a second condition for closing said circuit breaker, first thermoresponsive means for urging said control means into said first condition, second thermoresponsive means for urging said control means into said second condition, first energizing means for said thermoresponsive means effective when said circuit breaker is closed for varying the relative energizations of said thermoresponsive means in accordance with the direction of energy flow in said circuit, and second energizing means effective in cooperation with said first energizing means when said circuit breaker is open for varying the relative energizations of said thermoresponsive means in accordance with the voltage across the poles of said circuit breaker.

5. In an electrical distribution system, an electrical circuit having a voltage quantity and a current quantity therein, a circuit breaker for connecting and disconnecting portions of said electrical circuit, and control means for said circuit breaker including an electrical path having a pair of arms, first energizing means effective when said circuit breaker is closed including means for passing through said arms in series a current dependent on a first one of said quantities, and means for passing through said arms in parallel a current dependent on a second one of said quantities, second energizing means cooperating with said first energizing means when said circuit breaker is open for passing through said arms in series a first current and in parallel a second current, said currents being dependent on said voltage quantity and on a voltage quantity present across the circuit breaker poles, and means differentially responsive to the squares of the resultant currents traversing said arms for tripping and closing said circuit breaker.

6. In an alternating-current electrical distribution system, a feeder circuit having a current quantity therein, a network circuit for receiving electrical energy from said feeder circuit, one of said circuits having a voltage quantity therein, a plurality of coupling devices for coupling said network circuit to said feeder circuit, each of said coupling devices including a circuit breaker for controlling the connection and disconnection of said circuits, a transformer having its primary winding connected for energization in accordance with a first one of said quantities, a pair of translating means connected for energization in series with the secondary winding of said transformer, means for energizing said translating means in parallel in accordance with a second one of said quantities, each of said translating means being designed to produce an output controlled by the resultant energizing current applied thereto, means effective when said circuit breaker is open for replacing said current quantity by a voltage quantity across the poles of said circuit breaker for partially controlling the energization of said translating means, and circuit breaker control means differentially responsive to the outputs of said translating means.

7. In an alternating-current electrical distribution system, a feeder circuit having a current quantity therein, a network circuit for receiving electrical energy from said feeder circuit, one of said circuits having a voltage quantity therein, a plurality of coupling devices for coupling said network circuit to said feeder circuit, each of said coupling devices including a circuit breaker for controlling the connection and disconnection of said circuits, a transformer having its primary winding connected for energization in accordance with a first one of said quantities, said transformer including a secondary winding having a centrally disposed tap, a pair of thermo-motive devices connected for energization in series with the secondary winding of said transformer, means for energizing said thermo-motive devices in parallel in accordance with a second one of said quantities, said last-named means including a connection to said centrally disposed tap, each of said thermo-motive devices being designed to produce an output controlled by the resultant energizing current applied thereto, means effective when said circuit breaker is open for replacing said current quantity by a voltage quantity across the poles of said circuit breaker for partially controlling the energization of said thermo-motive devices, control means disposed for movement in a first direction in response to an increase in energization of a first one of said thermo-motive devices and for movement in a second direction in response to an increase in energization of a second one of said thermo-motive devices, and means responsive to the direction of movement of said control means for selectively tripping and closing said circuit breaker.

8. In an alternating-current system, a feeder circuit, a load circuit for receiving energy from said feeder circuit, and coupling means for coupling said load circuit to said feeder circuit, said coupling means including a circuit breaker for connecting and disconnecting said circuits, a transformer having its primary winding connected for energization in accordance with current flowing in said feeder circuit, said transformer having a secondary winding, an auxiliary winding mutually coupled to said secondary winding for inducing therein a voltage when said auxiliary winding is energized, means connecting said auxiliary winding for energization in accordance with voltage across the poles of said circuit breaker when said circuit breaker is open, circuit breaker control means, and energizing means for said control means including means connecting said control means for energization from said secondary winding.

9. In an alternating-current system, a feeder circuit, a load circuit for receiving energy from said feeder circuit, and coupling means for coupling said load circuit to said feeder circuit, said coupling means including a circuit breaker for connecting and disconnecting said circuits, a winding, means for inducing in said winding a voltage controlled by the current flowing in said feeder circuit, means effective when said circuit breaker is open for inducing in said winding a voltage controlled by voltage across the poles of said circuit breaker, a pair of translating means, first means connecting said translating means for first energization from said winding, means cooperating with said first means for adding to a first one of said translating means and subtracting from a second one of said translating means an energization controlled by voltage present on the load circuit side of said circuit breaker, and means differentially responsive to the outputs of said translating means for controlling said circuit breaker.

10. In an alternating-current system, a feeder circuit, a load circuit for receiving energy from said feeder circuit, and coupling means for coupling said load circuit to said feeder circuit, said coupling means including a circuit breaker for connecting and disconnecting said circuits, a winding, means for inducing in said winding a voltage controlled by the current flowing in said feeder circuit, means effective when said circuit breaker is open for inducing in said winding a voltage controlled by voltage across the poles of said circuit breaker, a pair of translating means having an output proportional to the square of their energization, means connecting said translating means in series with said winding, first means for energizing said translating means in parallel in accordance with voltage present on the load circuit side of said circuit breaker, each of said translating means being energized in accordance with the vector resultant of currents supplied by said winding and said first means, and control means differentially responsive to the outputs of said translating means for tripping and closing said circuit breaker.

11. In an alternating-current system, a feeder circuit, a load circuit for receiving energy from said feeder circuit, and coupling means for coupling said load circuit to said feeder circuit, said coupling means including a circuit breaker for connecting and disconnecting said circuits, a transformer having its primary winding connected for energization in accordance with current flowing in said feeder circuit, said transformer having a secondary winding, an auxiliary winding mutually coupled to said secondary winding for inducing therein a voltage when said auxiliary winding is energized, means connecting said auxiliary winding for energization in accordance with voltage across the poles of said circuit breaker when said circuit breaker is open, a pair of translating means, first means connecting said translating means for first energization from said winding, means cooperating with said first means for adding to a first one of said translating means and subtracting from a second one of said translating means an energization controlled by voltage present on the load circuit side of said circuit breaker, and means differentially responsive to the outputs of said translating means for controlling said circuit breaker.

12. In an alternating-current system, a feeder circuit, a load circuit for receiving energy from said feeder circuit, and coupling means for coupling said load circuit to said feeder circuit, said coupling means including a circuit breaker for connecting and disconnecting said circuits, a transformer having its primary winding connected for energization in accordance with current flowing in said feeder circuit, said transformer having a secondary winding, an auxiliary winding mutually coupled to said secondary winding for inducing therein a voltage when said auxiliary winding is energized, means connecting said auxiliary winding for energization in accordance with voltage across the poles of said circuit breaker when said circuit breaker is open, a pair of translating means having an output proportional to the square of their energization, means connecting said translating means in series with said winding, first means for energizing said translating means in parallel in accordance with voltage present on the load circuit side of said circuit breaker, each of said translating means being energized in accordance with the vector resultant of currents supplied by said winding and said first means, and control means differentially responsive to the outputs of said translating means for tripping and closing said circuit breaker.

13. In an alternating-current system, a feeder circuit, a load circuit for receiving energy from said feeder circuit, and coupling means for coupling said load circuit to said feeder circuit including a circuit breaker for connecting and disconnecting said circuits, a transformer having its primary winding connected for energization in accordance with current flowing in said feeder circuit, said transformer including a secondary winding, means effective when said circuit breaker is open for establishing a circuit including a portion of said secondary winding energized in accordance with voltage across said circuit breaker, whereby said secondary winding operates as an autotransformer, a pair of translating means, means for energizing said translating means respectively in accordance with the sum and difference of the output of said secondary winding and voltage present on the load circuit side of said circuit breaker, the specific translating means energized by the sum and the specific translating means energized by the difference varying in accordance with the direction of energy flow in said circuit or the direction of phasing energy depending on the condition of said circuit breaker, and circuit breaker control means differentially responsive to the outputs of said translating means.

14. In an electrical distribution system, an electrical circuit having a normal direction of energy flow, a circuit breaker for connecting and disconnecting feeder and load portions of said circuit, and circuit breaker control means including a pair of translating means, means differentially responsive to said translating means for selectively actuating said circuit breaker into connecting and disconnecting conditions, means responsive to a reversal in the normal direction of energy flow in said circuit for energizing said translating means to provide a differential output operating to trip said circuit breaker, means responsive to the condition of said circuit when said circuit is prepared to produce an energy flow in the normal direction for energizing said translating means to provide a differential output operating to close said circuit breaker, and means responsive to energization of said load portion for urging said circuit breaker control means towards circuit breaker closing condition.

15. In an electrical distribution system, an electrical circuit, a circuit breaker for connecting and disconnecting feeder and load portions of said circuit, a pair of operating means, means differentially responsive to said operating means for controlling said circuit breaker, and energizing means for said operating means, said energizing means including means effective when said circuit breaker is in circuit connecting condition for energizing said operating means respectively in accordance with the sum and difference of current and voltage present in said electrical circuit, means effective when said circuit breaker is in circuit disconnecting condition for energizing said operating means respectively in accordance with the sum and difference of voltage present in said circuit on one side of said circuit breaker and voltage between said portions of said electrical circuit, and means responsive to voltage of said load portion for urging said circuit breaker control means away from circuit breaker closing condition.

16. In a polyphase electrical distribution system, a polyphase feeder circuit, a polyphase network circuit, and a plurality of coupling devices each including a circuit breaker for connecting and disconnecting said network circuit and said feeder circuit, control means for tripping and closing said circuit breaker, and actuating means for said control means including a plurality of actuating devices, each of said actuating devices including a pair of translating means operating differentially to actuate said control means, means responsive to a reversal in the normal direction of energy flow in said feeder circuit for energizing said translating means to provide a differential output urging said control means towards tripping condition, and means effective when said circuit breaker is open in response to the condition of said circuits when said circuits are prepared to produce an energy flow in the normal direction for energizing said translating means to provide a differential output urging said control means towards circuit breaker closing condition, said devices being connected for energization from separate phases of said polyphase system.

17. In an electrical distribution system, an electrical circuit, a circuit breaker for connecting and disconnecting portions of said circuit, means responsive to the relationship of a first quantity in said electrical circuit to a second quantity therein comprising circuit breaker control means, a pair of operating means, means differentially responsive to said operating means for actuating said circuit breaker control means, and means dependent on the relationship of said first and second quantities when said circuit breaker is in circuit disconnecting condition for selectively energizing either of said operating means in accordance with the sum of said first and second quantities.

18. In an electrical distribution system, an electrical circuit, a circuit breaker for connecting and disconnecting portions of said circuit, a pair of operating means, means differentially responsive to said operating means for controlling said circuit breaker, and energizing means for said operating means, said energizing means including means effective when said circuit breaker is in circuit disconnecting condition for energizing said operating means respectively in accordance with the sum and difference of voltage present in said circuit on one side of said circuit breaker and voltage between said portions of said electrical circuit.

19. In an electrical distribution system, a feeder circuit, a network circuit, and a plurality of coupling devices for coupling said feeder circuit to said network circuit each including a circuit breaker for controlling the connection and disconnection of said feeder circuit relative to said network circuit, control means operable into a first condition for closing said circuit breaker, first thermoresponsive means for urging said control means into said first condition, second thermoresponsive means for urging said control means away from said first condition, first energizing means for said thermoresponsive means effective when said circuit breaker is closed for energizing said thermoresponsive means in accordance with voltage present in one of said circuits, and second energizing means effective in cooperation with said first energizing means when said circuit breaker is open for varying the relative energizations of said thermoresponsive means in accordance with the voltage across the poles of said circuit breaker.

20. In an electrical distribution system, an electrical circuit having a voltage quantity therein, a circuit breaker for connecting and disconnecting portions of said electrical circuit, and control means for said circuit breaker including an electrical path having a pair of arms, energizing means effective when said circuit breaker is open for passing through said arms in series a first current and in parallel a second current, said currents being dependent on said voltage quantity and on a voltage quantity present across the circuit breaker poles, and means differentially responsive to the squares of the resultant currents traversing said arms for closing said circuit breaker.

21. In an electrical distribution system, a feeder circuit, a network circuit, and a plurality of coupling devices for coupling said feeder circuit to said network circuit each including a circuit breaker for controlling the connection and disconnection of said feeder circuit relative to said network circuit, control means operable into a first condition for closing said circuit breaker, first magnetic means for urging said control means into said first condition, second magnetic means for urging said control means into said second condition, and energizing means effective when said circuit breaker is open for varying the relative energizations of said magnetic means in accordance with the variation in voltage across the poles of said circuit breaker relative to the voltage of one of said circuits.

FLOYD D. JOHNSON.